United States Patent
Krymski

(10) Patent No.: US 7,154,075 B2
(45) Date of Patent: Dec. 26, 2006

(54) METHOD AND APPARATUS FOR PIXEL SIGNAL BINNING AND INTERPOLATION IN COLUMN CIRCUITS OF A SENSOR CIRCUIT

(75) Inventor: Alexander Krymski, La Crescenta, CA (US)

(73) Assignee: Micron Technology, Inc., Boise, ID (US)

( * ) Notice: Subject to any disclaimer, the term of this patent is extended or adjusted under 35 U.S.C. 154(b) by 248 days.

(21) Appl. No.: 10/705,843

(22) Filed: Nov. 13, 2003

(65) Prior Publication Data

US 2005/0103977 A1    May 19, 2005

(51) Int. Cl.
*H01L 27/00* (2006.01)
*H04N 5/217* (2006.01)
(52) U.S. Cl. .................................. 250/208.1; 348/241
(58) Field of Classification Search ............. 250/208.1; 348/241, 247
See application file for complete search history.

(56) References Cited

U.S. PATENT DOCUMENTS

| | | | |
|---|---|---|---|
| 5,949,483 A | 9/1999 | Fossum et al. | |
| 6,222,175 B1 | 4/2001 | Krymski | |
| 6,377,304 B1 | 4/2002 | Saitoh | |
| 6,421,085 B1 | 7/2002 | Xu | |
| 6,850,278 B1* | 2/2005 | Sakurai et al. | 348/302 |
| 2002/0139921 A1 | 10/2002 | Huang et al. | |
| 2002/0154347 A1* | 10/2002 | Funakoshi et al. | 358/513 |
| 2003/0193580 A1* | 10/2003 | Okamoto | 348/222.1 |
| 2004/0246354 A1* | 12/2004 | Yang et al. | 348/308 |

FOREIGN PATENT DOCUMENTS

WO    WO/99/48281    9/1999

* cited by examiner

*Primary Examiner*—Thanh X. Luu
(74) *Attorney, Agent, or Firm*—Dickstein Shapiro LLP

(57) ABSTRACT

A binning circuit and related method, wherein pixel signals from column circuits in a sensor circuit are sampled and interpolated. The binning circuit samples analog pixel and reset signals from different sensor circuit column lines. Once a predetermined number of column lines are sampled in the binning circuit, the sampled pixel signals are averaged together in one operation, while the reset signals are averaged together in another operation.

33 Claims, 11 Drawing Sheets

METHOD AND APPARATUS FOR PIXEL SIGNAL BINNING AND INTERPOLATION IN COLUMN CIRCUITS OF A SENSOR CIRCUIT

FIELD OF THE INVENTION

The present invention relates generally to image sensors, and, in particular, to charge-domain analog readout circuits for such sensors.

BACKGROUND OF THE INVENTION

Image sensors find applications in a wide variety of fields, including machine vision, robotics, guidance and navigation, automotive applications, and consumer products. In many smart image sensors, it is desirable to integrate on-chip circuitry to control the image sensor and to perform signal and image processing on the output image. Unfortunately, charge-coupled devices (CCD), which have been one of the dominant technologies used for image sensors, do not easily lend themselves to large scale signal processing and are not easily integrated with CMOS circuits. Moreover, a CCD is read out by sequentially transferring the signal charge through the semiconductor, and the readout rate is limited by the need for nearly perfect charge transfer.

Active pixel sensors (APS), which have one or more active transistors within the pixel unit cell, can be made compatible with CMOS technologies and promise higher readout rates compared to passive pixel sensors. Active pixel sensors are often arranged as arrays of elements, which can be read out, for example, a column at a time. Each column can be read out at one time, driven and buffered for sensing by a readout circuit.

FIG. 1 shows an exemplary CMOS active pixel sensor integrated circuit chip that includes an array of active pixel sensors 30 and a controller 32 that provides timing and control signals to enable the reading out of signals stored in the pixels. Exemplary arrays have dimensions of N by M pixels and, in general, the size of the array 30 will depend on the particular implementation. The imager is read out a row at a time using a column parallel readout architecture. The controller 32 selects a particular row of pixels in the array 30 by controlling the operation of vertical addressing circuit 34 and row drivers 40. Charge signals stored in the selected row of pixels are provided to a readout circuit 42. The pixels of the columns can be read out sequentially using a horizontal addressing circuit 44. Typically, each pixel provides a reset output signal $V_{out1}$ and a signal representing accumulated charge during an integration period $V_{out2}$ which are provided at the output of the readout circuit 42.

As shown in FIG. 2, the array 30 includes multiple columns 49 of CMOS active pixel sensors 50. Each column 49 includes multiple rows of sensors 50. Signals from the active pixel sensors 50 in a particular column can be read out to a readout circuit 52 associated with that column. Signals stored in the readout circuits 52 can be sent to an output stage 54, which is common to the entire array of pixels 30. The analog output signals can then be sent, for example, to a differential analog-to-digital converter (ADC).

Excessive noise and slow frame rates are introduced during the read process of the differential charge mode readout from the columns of the CMOS image sensor. To compensate for this, current readout circuitry uses subsampling (under a sub-resolution mode) to increase the frame rate. In most imaging applications, a pixel is captured with each pulse of the pixel clock (except during blanking). Subsampling increases frame rates by capturing pixels at a rate slower than the base pixel clock frequency. For example, one pixel can be captured for every two pulses of the pixel clock to provide an effective sampling rate that is ½ the base pixel clock frequency. The use of subsampling allows a higher frequency pixel clock rate to clock lower-frequency sampling.

During subsampling, however, pixels are read out sequentially, but not contiguously. In other words, some pixels are skipped to obtain a lower resolution in exchange for a potentially higher frame rate. What is needed is an image sensor where the readout circuitry has improved sub-resolution characteristics with reduced aliasing.

BRIEF SUMMARY OF THE INVENTION

In general, embodiments of the invention provide an imaging circuit, system, and related methods for incorporating signal binning into the readout circuitry. Binning is defined as accumulating or interpolating the charge of multiple pixels and reading them out in a single operation. By incorporating binning into the readout circuitry, various sub-resolution processes can be implemented to minimize aliasing effects. Additionally, by using analog processing for the binning, signal bandwidth may be reduced. This in turn reduces the overall power requirements of the sensor. An additional benefit to using analog binning is that the signal-to-noise ratio (SNR) advantages achieved from binning are more pronounced in the analog domain than they are in the digital domain.

BRIEF DESCRIPTION OF THE DRAWINGS

These and other features and advantages of the invention will be more clearly seen from the following detailed description of the invention which is provided in connection with the accompanying drawings in which:

FIG. 11 shows a binned pixel matrix after the averaging process of FIGS. 8–10;

FIG. 12 is an exemplary configuration according to the invention that realizes a VGA Bayer pattern, where pixels are averaged from three rows and three columns;

FIG. 13 illustrates a ⅔ resolution binning scheme according to the present invention, where two rows from three columns of a pixel matrix are averaged;

FIG. 14 illustrates a binning scheme according to the present invention, where every third column is skipped in order to average out two columns and two rows;

DETAILED DESCRIPTION OF THE INVENTION

Figure 3:
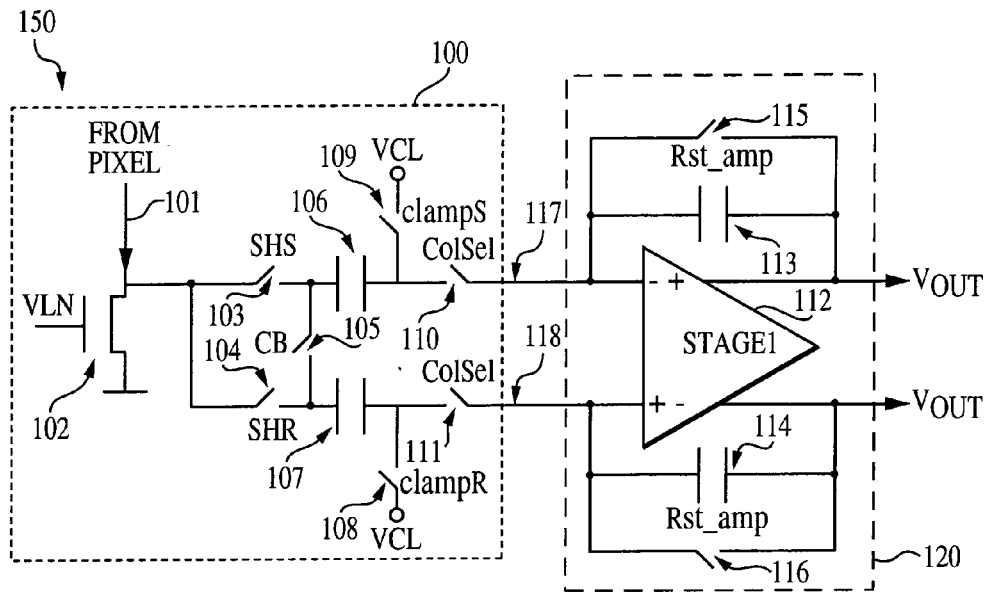
FIG. 3 is an exemplary charge mode readout circuit.

FIG. 3 illustrates a differential charge-domain readout circuit 150 for an image sensor, wherein a column readout circuit 100 receives a signal from a pixel along a column line 101. Examples of such circuitry may be found in commonly-assigned U.S. Pat. No. 6,222,175, which is incorporated by reference in its entirety herein. The readout circuit 100 includes a load transistor 102 that receives a signal (VLN) at its gate. As is known in the art, the VLN signal activates the load transistor 102 such that it provides a load on the column line 101. The column line 101 is further coupled to two sample-and-hold circuits for storing a pixel signal level when a first sample-and-hold signal (SHS) is applied and a reset level when a second sample-and-hold signal (SHR) is applied to the readout circuit 150. Sampling both the reset and pixel signal levels allows correlated double sampling (CDS) to be performed, which can reduce reset noise associated with the connected pixel as well as noise associated with the source-follower circuitry in the pixel sensor.

The first sample-and-hold circuit includes a switch 103, which may be implemented as a transistor, and a capacitor 106. The first sample-and-hold signal SHS is applied to the switch 103 to control whether the switch 103 is in a conductive or non-conductive state. The second sample-and-hold circuit also includes a switch 104, which also may be implemented as a transistor, and a capacitor 107. The second sample-and-hold signal SHR is applied to the switch 104 to control the state of the switch 104. Capacitors 106, 107 can be held at a reference voltage (VCL) by closing switches 109, and 108, respectively. The signal clampS controls the state of switch 109, and the signal clampR controls the state of switch 108.

In addition to the sample-and-hold circuits, the column readout circuit 100 includes a crowbar switch 105, which also may be implemented as a transistor. The state of the crowbar transistor 105 is controlled by an external crowbar control signal (CB). Use of the crowbar switch 105 can help reduce fixed pattern noise (FPN) caused by column-to-column variations due to the column parallel readout structure (described above).

Signals stored by the capacitors 106, 107 can be transmitted to the output stage 120 through respective column select switches 110, 111, which may be implemented as transistors. The column selection signal (ColSel) applied to the switches 110, 111 controls whether those switches 110, 111 are conductive or non-conductive. When the column selection switch 110 (or 111) is turned on, the sampling capacitor 106 (or 107) is coupled directly to a bus 117 (or 118) connected to the output stage 120. It should be appreciated that both switches 110, 111 may be closed at the same time if desired. It should also be understood that any other suitable storage device may be substituted for the capacitors 106, 107.

As mentioned previously, the output stage 120 of the charge-domain readout circuit 150 is common to the entire array 30 of pixels. Thus, although only a single circuit 150 is illustrated in FIG. 3, multiple column readout circuits are coupled to the output stage 120. The output stage 120 includes a switched integrator, which further includes a differential operational amplifier 112, two feedback capacitors 113, 114, respectively coupled between the output $V_{out1}$, $V_{out2}$ and the negative and positive terminals of the operational amplifier 112. Reset switches 115, 116 are respectively coupled between the output $V_{out1}$, $V_{out2}$ and the negative and positive terminals of the operational amplifier 112. Each integrator output stage 120 can be selectively reset by turning on the associated reset switch 115, 116 using a signal Rst_amp. The operational amplifier 112 provides two output signals $V_{out1}$, $V_{out2}$ that are then transmitted to the analog-to-digital converter (not shown in FIG. 3).

Figure 1:
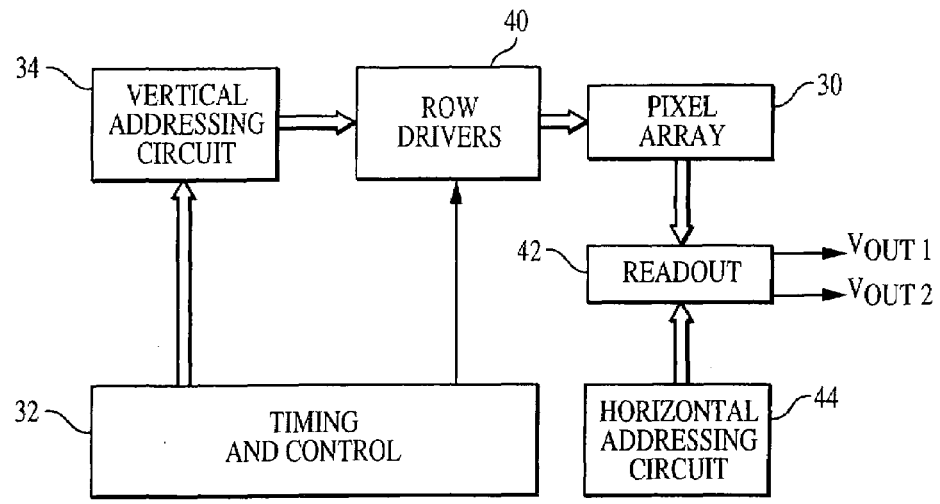
FIG. 1 is a block diagram of an exemplary prior art CMOS active pixel sensor chip.
Figure 2:
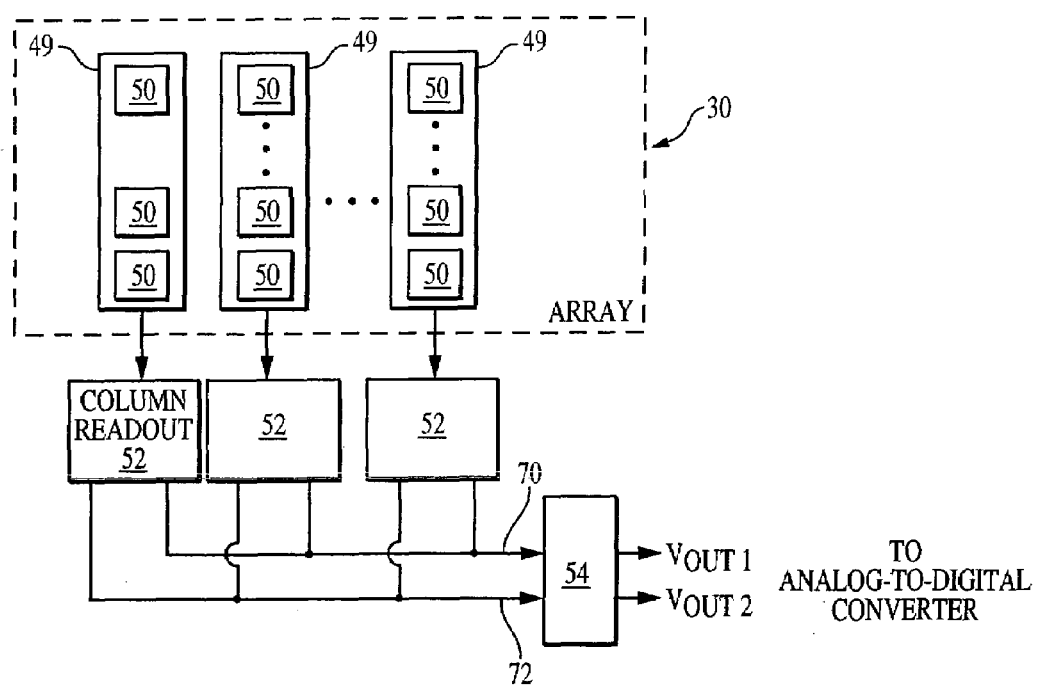
FIG. 2 is a block diagram of a conventional array of active pixel sensors and a readout circuit.
Figure 4:
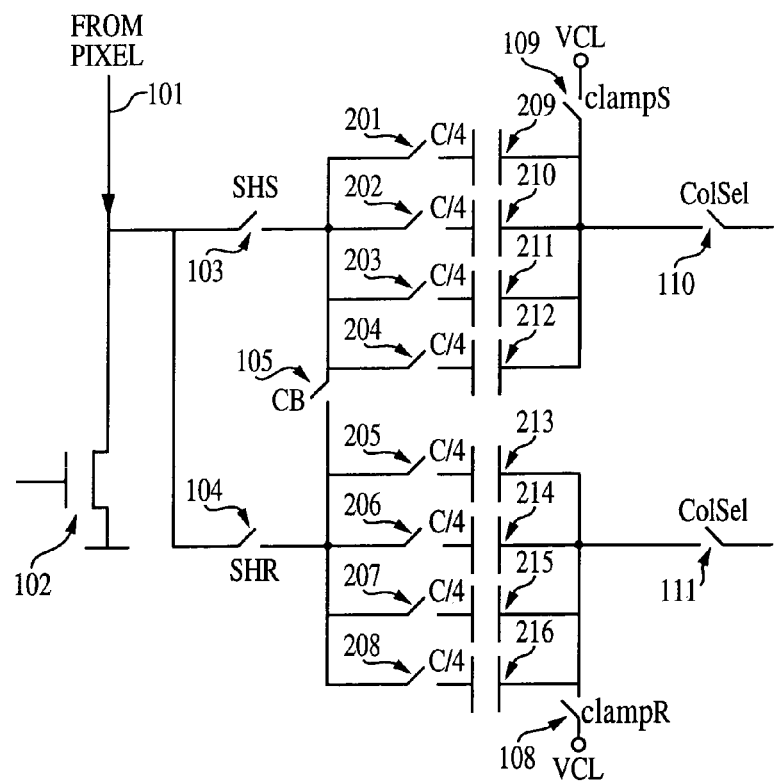
FIG. 4 shows vertical binning by implementing a split-capacitor configuration in accordance with an exemplary embodiment of the invention.

FIG. 4 illustrates an embodiment of the invention, wherein vertical binning is implemented in the readout circuit 100 of FIG. 3. The capacitors 106, 107 of FIG. 3 are "split out" in the illustrated exemplary embodiment of FIG. 4. The capacitive value of capacitors 106, 107 are replaced by multiple smaller capacitive elements 209–216, which each make up a fraction (e.g., ¼) of the original capacitance. Each capacitor 209–216 is coupled to a respective switch 201–208, where each switch 201–208 is controllable to obtain different resolutions for an array 30 (FIG. 2) under a predetermined sampling sequence. For example, if all the switches 201–208 are closed during operation, the capacitors 209–216 would essentially behave as one capacitor (i.e., full resolution), and the effective capacitance would be the same as that shown in FIG. 3. It should be understood that, while the embodiment in FIG. 4 shows a four-capacitor configuration (i.e., each capacitor being split into 4 capacitive elements), any number of capacitor splits (2, 3, 4, 6, etc.) may be used. As another example, if only half of the switches are closed, the readout circuit would be in a ½ resolution condition.

As an example, the embodiment of FIG. 4 may be used with monochrome sensor schemes where the sensor may be configured to support full resolution, ½ resolution and ¼ resolution in the vertical direction. For the sake of simplicity, it is assumed in the example that the horizontal resolution is defined outside the chip. Under ½ resolution, the signal received from a first row of the array is sampled and stored on two of the capacitors (e.g., capacitors 209–210 and 213–214) by enabling the respective switches (e.g., switches 201–202 and 205–206) associated with those capacitors. Signals received from a second row are sampled and stored on the two other capacitors (e.g., capacitors 211–212 and 215–216) by enabling their respective switches (e.g., switches 203–204 and 207–208). After sampling the data (during a crowbar operation), the left plates of the capacitors 209–216 are shorted, wherein an averaged signal of the first and second rows is outputted. It should be noted that the gain of the circuit of FIG. 4 remains stable during this operation, which adds flexibility in using the circuit.

Under a ¼ resolution operation, signals received from the first four rows of a column are separately sampled to a respective capacitor 209–212, 213–216. After the four rows are stored, the left plates of the capacitors 209–216 are shorted to output an averaged signal among the four rows for the particular column.

Bayer patterns are typically used to acquire color images when color sensing is used. Bayer color filter arrays are known in the art and are used to digitally acquire color images. The Bayer pattern of color filters are such that half the total number of pixels are green, while a quarter of the remaining pixels are red, and a quarter of the remaining pixels are blue.

Under a ½ resolution operation for a 4-row pixel, a color signal from a first row is read out and sampled on the first two capacitors 209–210, 213–214 of each sample line (i.e., pixel signals on capacitors 209–210, reset signals on capacitors 213–214). Next, the signal on the third row is sampled to the other two capacitors 211–212, 215–216 of the sample lines. The four capacitors 209–212, 213–216 from each sample line are then shorted together; the averaged sum for rows 1 and 3 are read out (via switches 110, 111). The same process is repeated with rows 2 and 4, where the row signals are averaged and read out as described above.

The ¼ resolution readout process for color signals is similar to the ½ resolution described above, where rows 1, 3, 5, and 7 are first stored on a respective capacitor 209–212, 213–216, averaged and read out; subsequently, rows 2, 4, 6, and 8 are stored on a respective capacitor 209–212, 213–216, averaged and read out.

Figure 5:
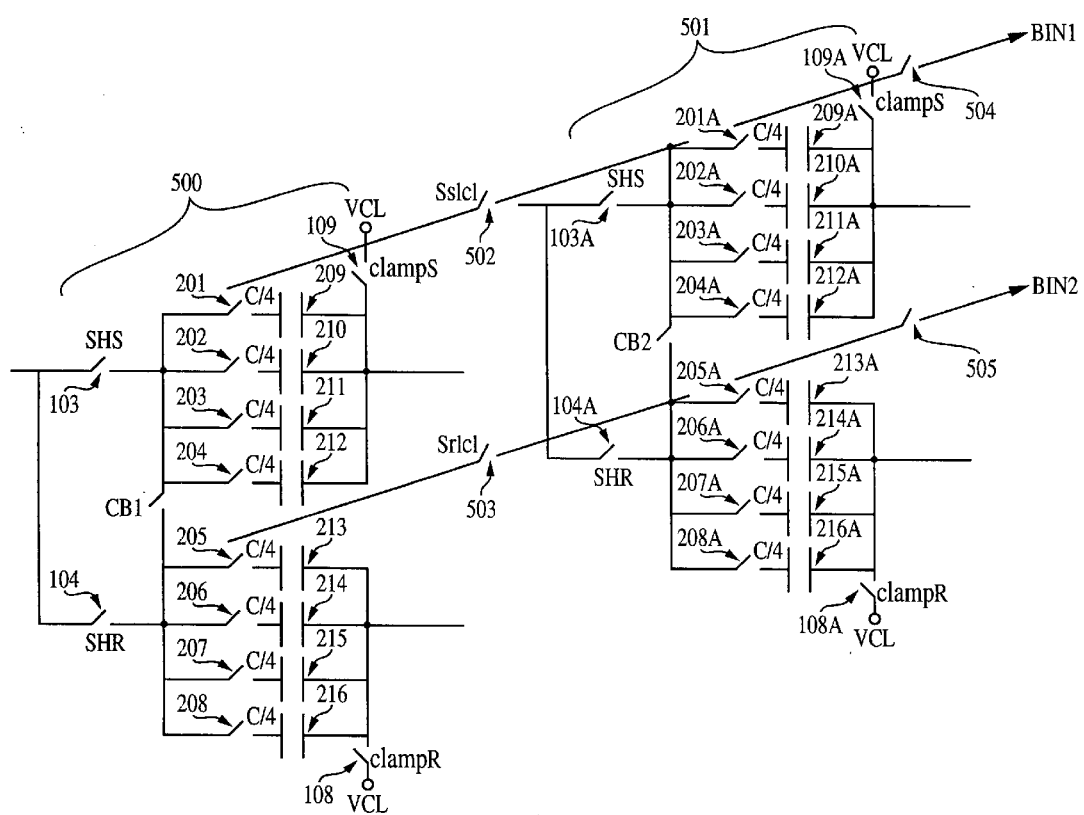
FIG. 5 illustrates a horizontal averaging scheme among column lines in accordance with another exemplary embodiment of the invention.

Turning to FIG. 5, another embodiment of the invention is illustrated, where each binning circuit 500 has a sample and hold pixel signal and sample and hold reset signal node coupled to a neighboring circuit 501 via respective switches 502, 503. Binning circuit 501 also connects to a neighboring binning circuit (not shown) through switches 504, 505. Additional binning circuits can be added as required, and the outputs (BIN1 and BIN2) carry a "horizontally" averaged signal (i.e., average signal between the column circuits).

When using the circuit of FIG. 5 in a monochrome sensor, averaged signals from the binning circuits 500, 501 are added together between the odd and even neighboring columns (discussed in greater detail below in connection with FIGS. 15A–C). For color sensors, the columns are read out in accordance with the Bayer pattern (discussed above). The range of averaging and the number of shorted columns can be adjusted depending on the resolution required. It should also be understood that the circuits and methods described herein are equally applicable to other types of imaging devices (e.g., charge-couple devices (CCDs)).

Figure 6:
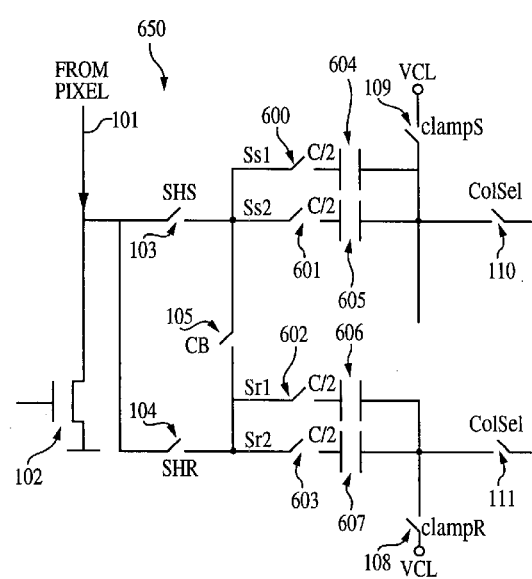
FIG. 6 illustrates a ½ capacitance line averaging circuit according to another exemplary embodiment of the invention.

FIG. 6 illustrates another embodiment of the invention, wherein the readout circuit 650 is similar to that discussed in FIG. 4, except that each capacitor 604–605, 606–607 of a sample line makes up one-half (C/2) of each sample line capacitance (as opposed to the one-quarter shown in FIG. 4). Each capacitor 604–607 is coupled to a respective switch 600–603. Each of the switches 600–603 are controllable to obtain different (i.e., less-than-full and full) resolutions for the circuit 650 when opened and closed.

Figure 7:
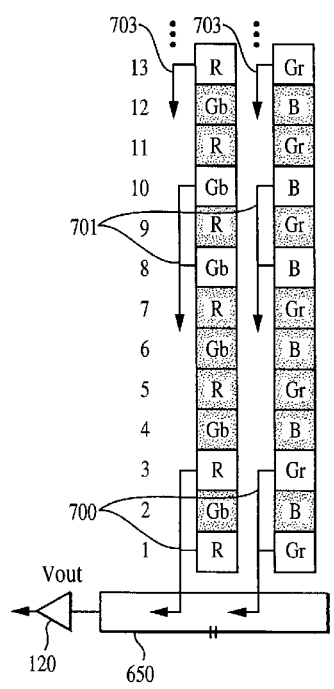
FIG. 7 shows an exemplary color averaging operation for the circuit of FIG. 6.

The readout circuit 650 of FIG. 6 may be operated to sum together charges of the same pixel color in each column. The result from this kind of operation emulates that of a high resolution "skip mode" used in CCD devices, such as that used in the Sony ICX252AQ 3 Megapixel CCD. An exemplary operation of the FIG. 6 circuit 650 is shown in FIG. 7, where the row selection algorithm in the readout circuit is configured to read out red colors (R) from rows 1 and 3 (700) and store them on capacitors 604–605. The reset signals from rows 1 and 3 are also read out (not shown) and stored on capacitors 606, 607. The left plates of the capacitors 604–607 are then shorted to output an averaged signal of the red colors of first and the third row.

The process of FIG. 7 continues with the green color (Gr) of rows 1 and 3, where the green colors (Gr) are read out (700) and stored on capacitors 604–605. The reset signals of the Gr pixels from rows 1 and 3 are also read out (not shown) and stored on capacitors 606, 607. The left plates of the capacitors 604–607 are then shorted to output an averaged signal of the Gr colors of first and the third row. Next the green (Gb) and blue (B) signals from rows 8 and 10 are read out (701) in a similar fashion, then rows 13 and 15 (703) are read out as shown in FIG. 6, and so on.

For emulation of a 4 megapixel CCD (e.g., Sony ICX406AQ 4 megapixel (Meg) CCD) in high frame readout mode, rows 1 and 5, 10 and 14, 17 and 21, etc. are summed in a manner identical to that described above. To realize this exemplary binning scheme, the circuit discussed in FIGS. 6–7 may be used, where the row selection algorithm is adjusted to accommodate the readout order.

Figure 8:
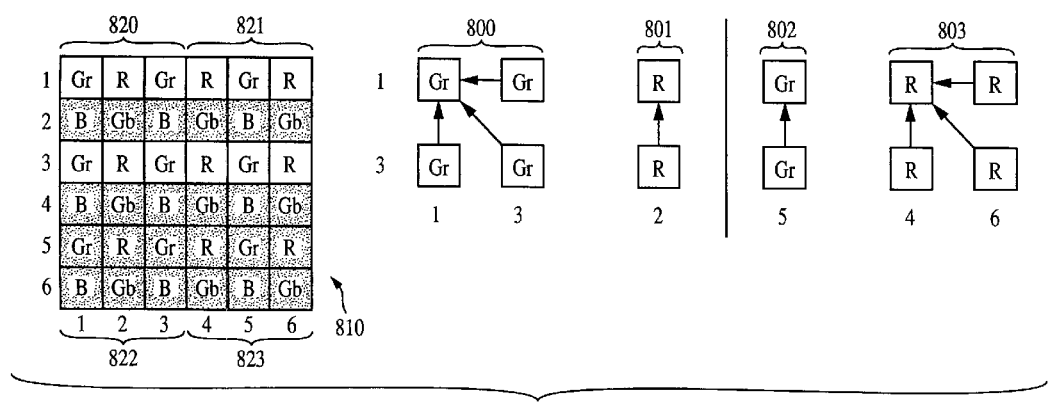
FIG. 8 illustrates an exemplary color averaging process for a first square of a pixel matrix in accordance with an exemplary embodiment of the invention.
Figure 9:
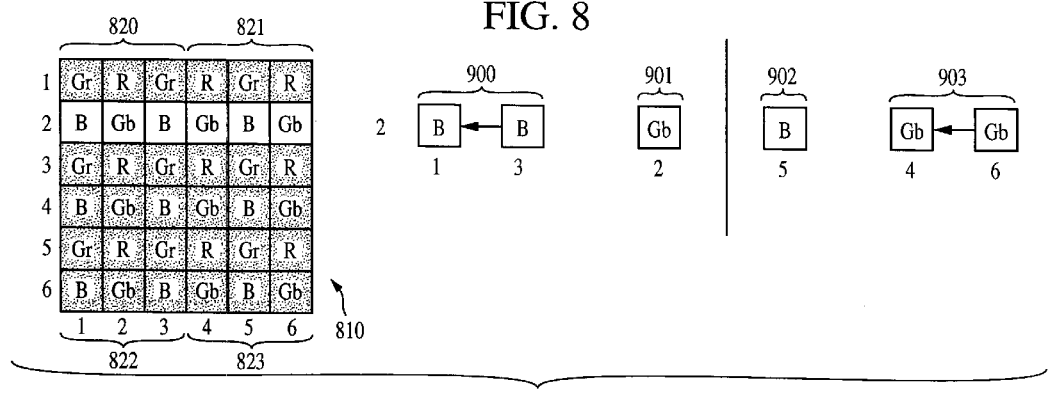
FIG. 9 illustrates an exemplary color averaging process for a second square of a pixel matrix in accordance with an exemplary embodiment of the invention.
Figure 10:
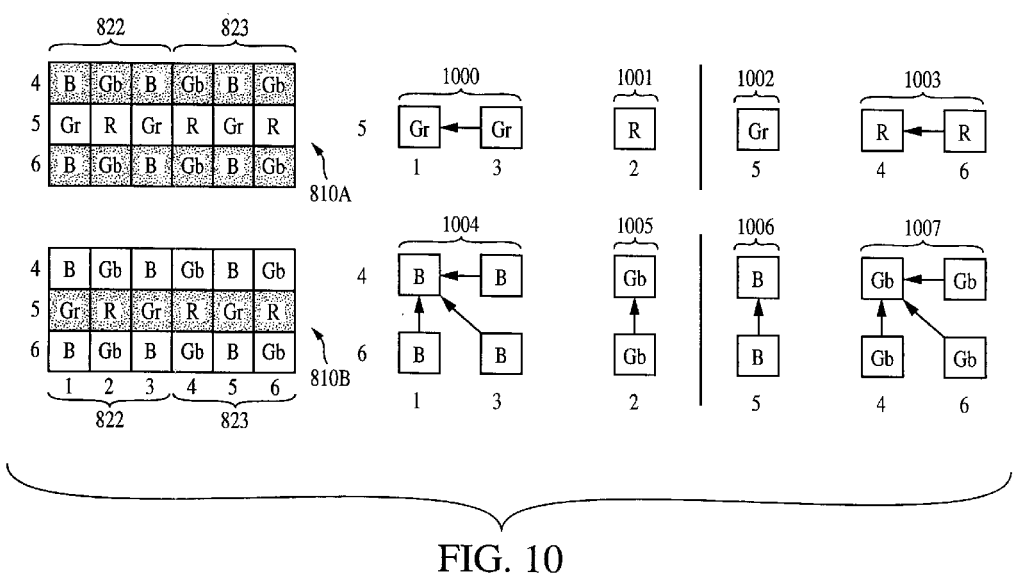
FIG. 10 illustrates an exemplary color averaging process for third and fourth squares of a pixel matrix in accordance with an exemplary embodiment of the invention.

FIGS. 8–10 disclose another sub-resolution scheme for a 3 Meg sensor. The maximum (full) resolution for a 3 Meg sensor is approximately 2048×1536. Exemplary sub-resolutions for the 3 Meg sensor are 1280×1024 (⅔ resolution), 1024×768 (½ resolution), and 640×480 (¼ resolution). In order to accurately read out the sub-resolution pixel signals, it is necessary to average out the pixel signals.

FIG. 8 shows an exemplary 6×6 pixel matrix 810, where the colors of the matrix 810 are arranged in a Bayer pattern, and where rows that are being read out are shown as illuminated (i.e., not shaded). The Bayer pattern consists of first (Gr) and second (Gb) green pixels, a red (R) pixel, and a blue (B) pixel. Gr and R color pixels alternate in odd rows 1, 3, 5, etc. B and Gb color pixels alternate in even rows 2, 4, 6, etc. Under a ⅔ readout scheme in the exemplary embodiment (i.e., ⅔ of the full resolution), rows 1 and 3 are read out from a first 3×3 square 820 of matrix 810, and stored in a readout circuit, such as one described above for FIG. 4. During the first pass (800), the switches in the readout circuit are arranged to first average the first green pixels from rows 1 and 3 as follows: $Gr(1,1)+Gr(1,3)+Gr(3,1)+Gr(3,3)$, where the format $Gr(1,3)$ designates the green pixel in row 1, column 3, $Gr(3,1)$ designates the green pixel in row 3, column 1, and so on. After the first green pixels from rows 1 and 3 are averaged out, the averaging process moves to the red pixels (801), wherein the summation of $R(1,2)+R(3,2)$ is executed.

After the first pixel square 820 is read out, the process continues to the second pixel square 821, where the Gr pixels are read out (802) and averaged according to $Gr(1,5)+Gr(3,5)$, and red pixels are read out (803) and averaged according to $R(1,4)+R(1,6)+R(3,4)+R(3,6)$. As can be appreciated by those skilled in the art, the fifth column (802) is read out prior to the fourth and sixth columns (803) in order to preserve the Bayer pattern. After squares 820 and 821 are read out and averaged, the process moves on to the second pass, illustrated in FIG. 9.

In FIG. 9, the second row is processed with the blue pixels in the first pixel square 820 being read out and averaged (900) according to $B(2,1)+B(2,3)$. Next, the second green pixel (Gb) is read out (901), but is not averaged, since it is the only pixel color in the row for the square 820. The process continues to the second square 821, where the blue pixel is read out (902), but not averaged, and the second green pixels (Gb) are read out and averaged (902) according to Gb(2,4)+Gb(2,6). For a more simplified algorithm, the second green pixel (Gb) (901) may be skipped, or alternately read out and added to the first green pixels (Gr) from the first pass with a relative weight of ⅕th.

Turning to FIG. 10, the averaging process proceeds to the third 822 and fourth 823 squares of matrix 810, where the fifth row is read out under a first pass (810A), followed by the 4th and 6th row in a second pass (810B). In the first pass, starting with the third square 822, the first green pixels (Gr) for the fifth row are read out, and are averaged (1000) according to Gr(5,1)+Gr(5,3), followed by the reading out of the red pixel (1001) R(5,2) in square 822. Turning to the fourth square 823, the one first green pixel (Gr) in the fifth row Gr(5,5) is read out (1002), followed by the reading out of the red pixels, which are read out and averaged (1003) according to R(5,4)+R(5,6).

Continuing, the 4th and 6th rows are read out in the second pass. Starting in square 822, the blue pixels are read out and averaged (1004) according to B(4,1)+B(4,3)+B(6,1)+B(6,3). Next, the second green pixels (Gb) are read out and averaged (1005) according to Gb(4,2)+Gb(6,2). Moving to square 823, the blue pixels are read out and averaged (1006) according to B(4,5)+B(6,5), and the Gb green pixels are read out and averaged (1007) according to Gb(4,4)+Gb(4,6)+Gb(6,4)+Gb(6,6).

Figures 11, 12, 13, 14:
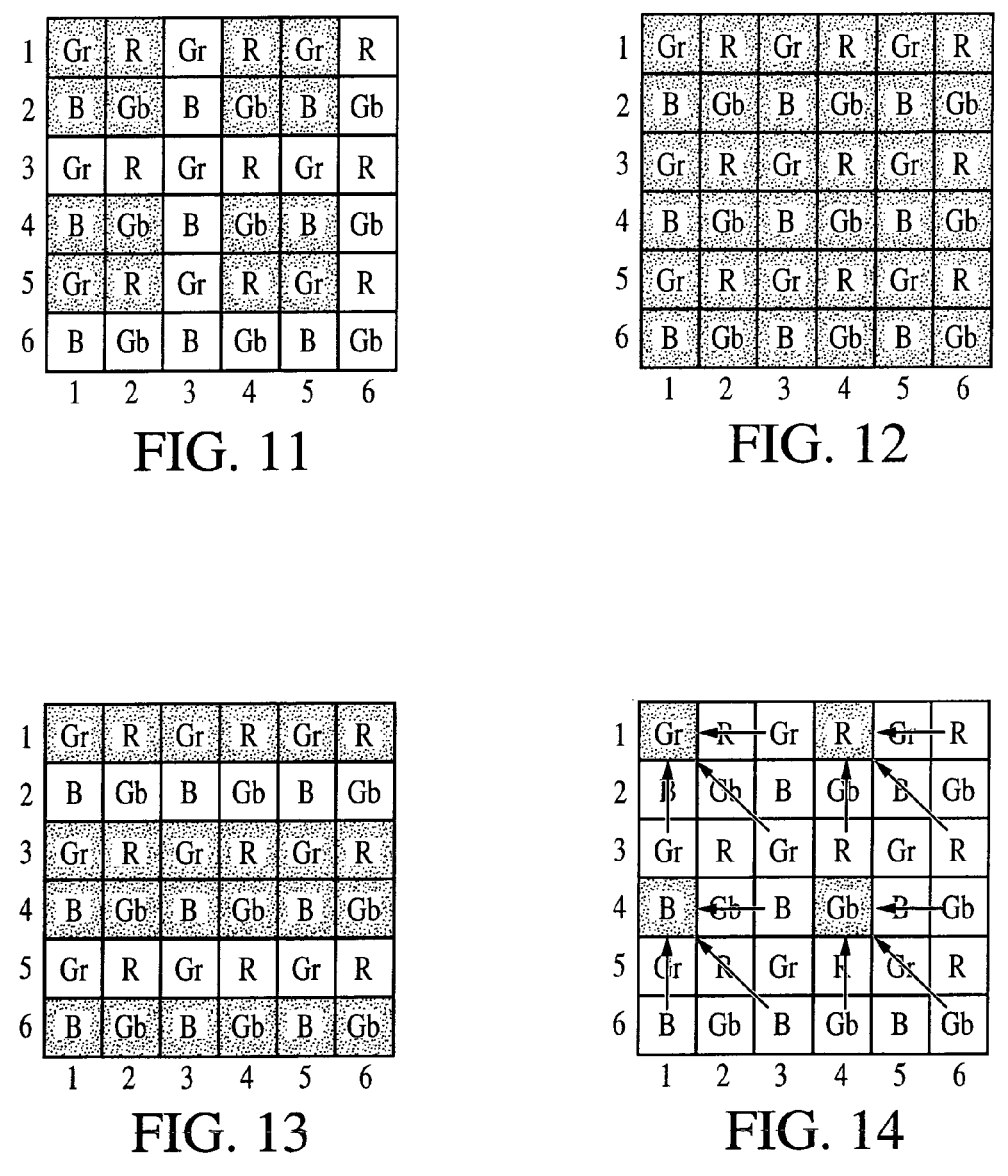

The pixels that were binned (i.e., read out and averaged) according to FIGS. 8–10 above, are illustrated in FIG. 11 as shaded pixels. As can be seen, ⅔ of the resolution (4×4 matrix from a 6×6 matrix) of the Bayer pattern is realized. To preserve the "Bayer-like" pattern shown in FIG. 11, column 5 should be read before column 4, and row 5 should be read before row 4.

Under a VGA Bayer mode, each 6×6 pixel square should output two green pixels, one red, and one blue pixel. An exemplary scheme that realizes a VGA Bayer pattern is illustrated in FIG. 12, where pixels are averaged from three rows and three columns. Using any of the circuitry discussed above in connection with FIGS. 3–7, pixels to be averaged are designated as a first green (Gr), red (R), second green (Gb) and blue (B). First, rows 1, 3 and 5 are enabled, and columns 1, 3, 5 and 2, 4, 6 are averaged. Next, rows 2, 4 and 6 are enabled, averaged and read out in a similar way. Under this binning scheme, no pixel data is skipped.

Another binning scheme is illustrated in FIG. 13, which averages two rows (e.g., rows 2 and 5) over three columns, thus obtaining ⅔ of the pixel data (⅓ of the pixels are skipped). Alternately, FIG. 14 illustrates a similar binning scheme where every third column is skipped in order to average out two columns and two rows, thus preserving ⁴⁄₉ of the pixel data (⅝ of the pixels are skipped). It should be apparent to those skilled in the art that similar binning and averaging schemes may be made for other pixels (1.3 Meg, 4 Meg, 5 Meg, etc.) under a variety of resolutions, such as 2048×1536, 1600×1200, 1280×1024, 1024×768, etc.

Figures 15A, 15B, 15C:
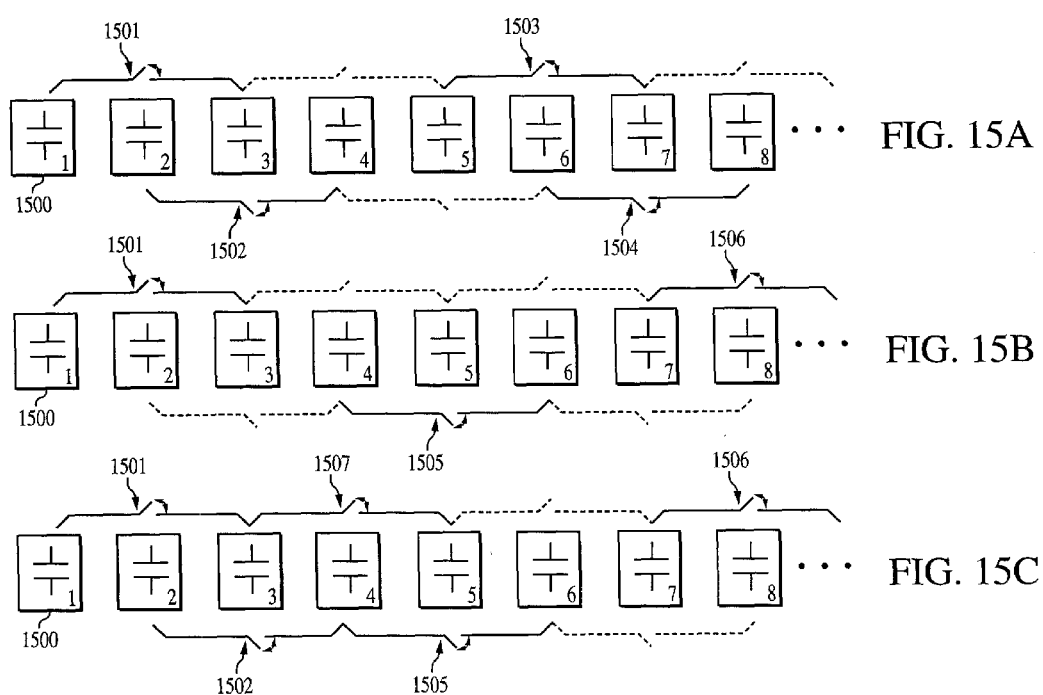
FIG. 15A illustrates an exemplary horizontal binning scheme that realizes a 1024×768 RGB resolution in accordance with another embodiment of the invention.
FIG. 15B illustrates an exemplary horizontal binning scheme that realizes a 1280×1024 RGB resolution in accordance with yet another embodiment of the invention.
FIG. 15C illustrates an exemplary horizontal binning scheme that realizes a "⅓ skip" VGA Bayer resolution in accordance with yet another embodiment of the invention.

FIGS. 15A–C illustrate various horizontal binning schemes that also may be used in accordance with the present invention, particularly with the FIG. 5 embodiment. Specifically, FIGS. 15A–C each disclose the first eight column storage circuits 1500 from a column storage system. The column storage circuits are substantially similar to the storage circuits 500, 501 shown in FIG. 5. Each of the eight column storage circuits 1500 have interconnecting column switches 1501–1507 that activate a binning operation between columns as discussed above in connection with FIG. 5.

To illustrate a binning operation between the eight column circuits, it is assumed that a full resolution for the eight columns is 2048×1536. In FIG. 15A, a ½ resolution embodiment is shown (1024×768 RGB), where the switches 1501–1504 are activated to provide binning between columns 1 and 3, 2 and 4, 5 and 7, and 6 and 8. In FIG. 15B, a 1280×1024 RGB (or alternately VGA true color, or VGA Bayer ⅝ skip) resolution is illustrated, where switches 1501, 1505 and 1506 are activated to provide binning between columns 1 and 3, 4 and 6, and 7 and 9 (not shown). Finally, FIG. 15C illustrates a VGA Bayer-type response, using a "⅓ skip" scheme, where switches 1501 and 1507, 1502 and 1505 etc., are activated so that columns 1, 3 and 5 are binned then columns 2, 4 and 6, and so on.

Figure 16:
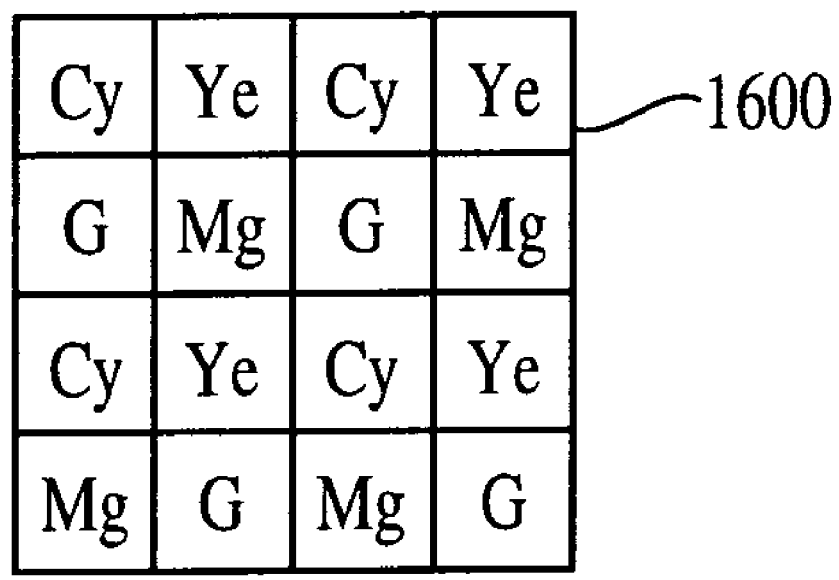
FIG. 16 illustrates a Mg-Cy-Ye-G filter array from which color separation values are calculated in accordance with yet another embodiment of the invention.

Referring now to FIG. 16, a subtraction of column/row pixel values is depicted in connection with an Mg-Cy-Ye-G filter array 1600. The color separation values can be calculated as C2−C1=(Ye+Mg)−(Cy−G) or C3−C4=(Cy+Mg)−Ye−G). In order to achieve this, the pixel reset signal is stored in the capacitor ordinarily used to store pixel signals and the pixel signal is stored on the capacitor ordinarily used to store reset signals.

For example, with reference to FIG. 6, in order to calculate color separation values, pixel signals are stored on capacitors 606, 607 and reset signals are stored on capacitors 604, 605. As a result, the values are subtracted.

It should be noted that the binning circuits and related methods described above also provide improved signal-to-noise ratio (SNR) characteristics in readout circuits, since several storage capacitors keep copies of the same signal as one signal is being read out. Consequently, the dithering that results from reading out all the copies improves SNR characteristics and color spatial noise.

Figure 17:
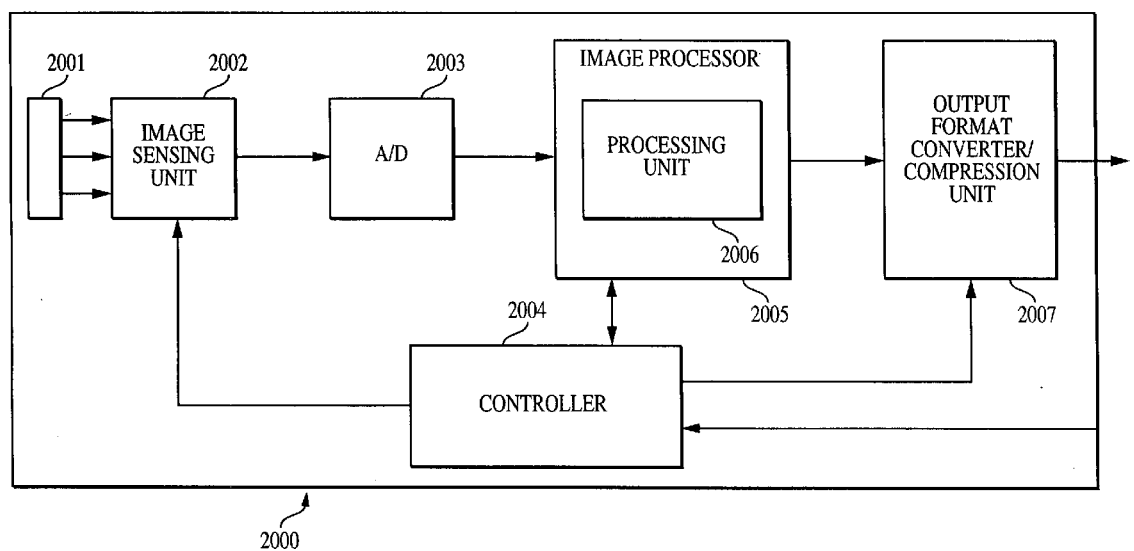
FIG. 17 illustrates a block diagram of an imaging apparatus in accordance with yet another embodiment of the invention.

An example of an imaging apparatus 2000 incorporating any of the binning circuits and related methods described above is shown in FIG. 17, and includes a lens system 2001 for directing light from an object to be imaged to the image sensing unit 2002 including an image sensor; an analog-to-digital converter 2003 for converting the image signals received at the image sensing unit 2002 into digital signals; the image/color processing unit 2005 for performing image correction processes such as color interpolation, sharpness filtering, white balancing, etc.; an output format conversion/compression unit 2007 for converting the image data into an appropriate file format for being outputted or displayed to the user; and a controller 2004 for controlling the operations of the entire imaging apparatus 2000.

The image sensor in the image sensing unit 2002 is preferably constructed as an integrated circuit which includes pixels made of a photosensitive material such as silicon. The image sensor may be formed as a CMOS sensor and combined with a processor, such as a CPU, digital signal processor or microprocessor, in a single integrated circuit. Alternatively, the image sensor in the image sensing unit 204 may be constructed as a charge coupled device (CCD).

Without being limiting, such an imaging apparatus 2000 could be part of a computer system, camera system, scanner, machine vision system, vehicle navigation system, video telephone, surveillance system, auto focus system, star tracker system, motion detection system, image stabilization system and data compression system for high-definition television, all of which can utilize the present invention.

Figure 18:
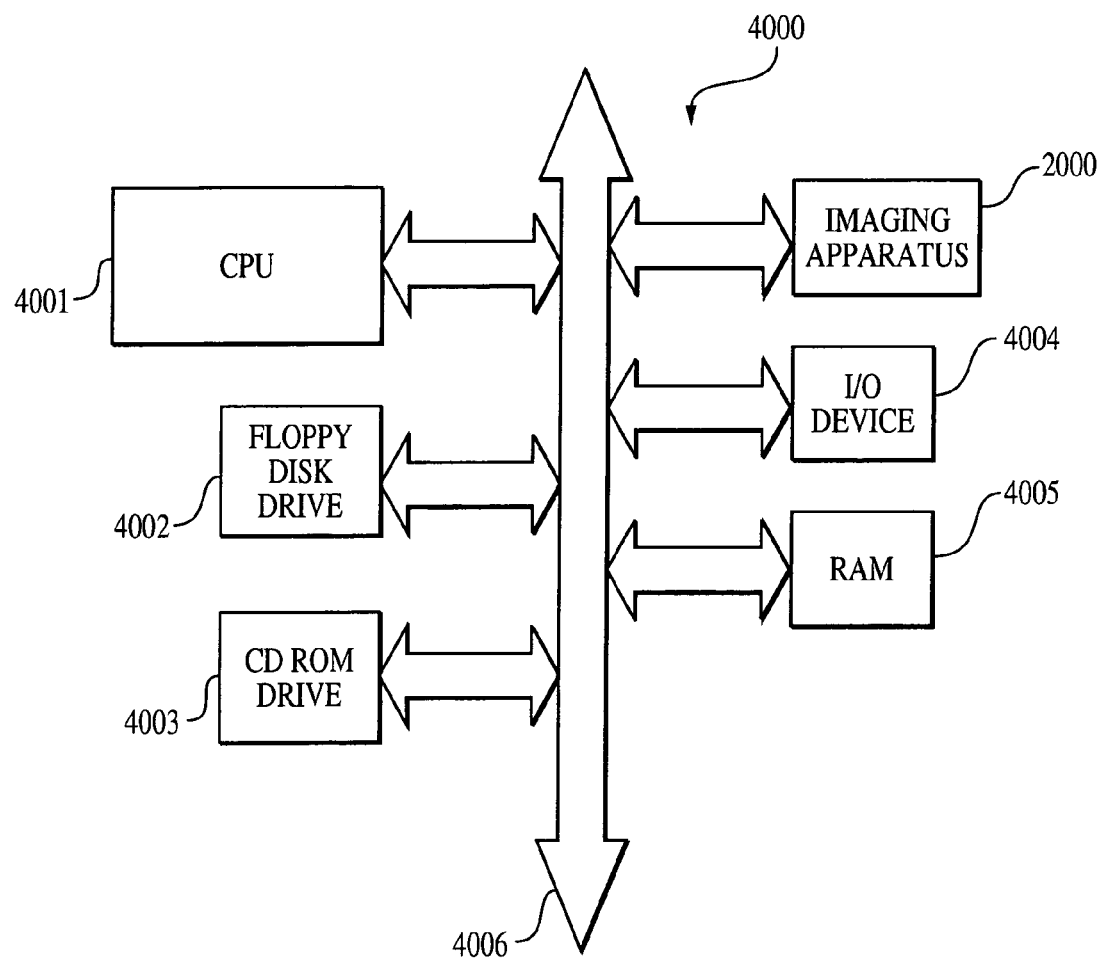
FIG. 18 illustrates a processing system that uses a binning circuit constructed in accordance with any of the embodiments of the invention.

An exemplary processor system 4000 to which the imaging apparatus 2000 may be connected is shown in FIG. 18.

The processing system 4000, such as a computer system, for example, generally comprises a central processing unit (CPU) 4001 that communicates with an input/output (I/O) device 4004 over a bus 4006. The imaging apparatus 2000 communicates with the system over bus 4006 or a ported connection. The processor system 4000 also includes random access memory (RAM) 4005, and, in the case of a computer system, may include peripheral devices such as a floppy disk drive 4002 and a compact disk (CD) ROM drive 4003 which also communicate with CPU 4001 over the bus 4006.

While the invention has been described in detail in connection with preferred embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. Accordingly, the invention is not limited by the foregoing description or drawings, but is only limited by the scope of the appended claims

What is claimed as new and desired to be protected by Letters Patent of the United States is:

1. An image sensor readout circuit, comprising:
    a column line for receiving a plurality of analog pixel and analog reset signal values; and
    a binning circuit coupled to said column line, wherein said binning circuit comprises:
        a first plurality of charge storage devices for respectively storing a predetermined first plurality of analog pixel signal values from a plurality of pixels from said column line,
        a first combining circuit for combining said stored first plurality of analog pixel signal values and outputting them on a first output line,
        a second plurality of charge storage devices for respectively storing a predetermined second plurality of analog reset signal values from said plurality of pixels from said column line, and
        a second combining circuit for combining said second plurality of analog reset signal values and outputting them on a second output line.

2. The readout circuit of claim 1, wherein said first combining circuit comprises a first plurality of sample switches; and said first plurality of charge storage devices comprises a first plurality of capacitive elements, and
    each of said first plurality of sample switches is coupled to a respective one of said first plurality of capacitive elements, said first plurality of capacitive elements being further coupled to the first output line.

3. The readout circuit of claim 2, wherein
    said second combining circuit comprises a second plurality of sample switches,
    wherein said second plurality of charge storage devices comprises a second plurality of capacitive elements, and each of said second plurality of sample switches is coupled to a respective one of said second plurality of capacitive elements, said second plurality of capacitive elements being further coupled to the second output line.

4. The readout circuit of claim 3, wherein said first and second plurality of sample switches and capacitive elements comprise an even number of sample switches and capacitive elements.

5. A binning circuit for an image sensor, comprising:
    a column line for receiving analog pixel and analog reset signal values of an active pixel sensor;
    a first sample circuit coupled to said column line, said first sample circuit comprising a first plurality of charge storage devices respectively storing a first plurality of analog pixel signal values from a plurality of pixels from said column line;
    a second sample circuit coupled to said column line, said second sample circuit comprising a second plurality of charge storage devices respectively storing a second plurality of analog reset signals signal values from said plurality of pixels from said column line;
    a first switch coupled to said first sample circuit and to a first output line, said first switch being controlled to combine said stored first plurality of analog pixel signal values and output said combined pixel signal values on said first output line; and
    a second switch, coupled to said second sample circuit and to a second output line, said second switch being controlled to combine said stored second plurality of analog reset signal values and output said combined reset signal on said second output line.

6. The binning circuit of claim 5, wherein said first sample circuit further comprises:
    a first plurality of sample switches,
    wherein said first plurality of charge storage devices comprises a first plurality of capacitive elements, and
    wherein each of said first plurality of sample switches is coupled to a respective one of said first plurality of capacitive elements, said first plurality of capacitive elements being further coupled to the first output line.

7. The binning circuit of claim 6, wherein said second sample circuit further comprises:
    a second plurality of sample switches,
    wherein said second plurality of charge storage devices comprises a second plurality of capacitive elements, and
    wherein each of said second plurality of sample switches is coupled to a respective one of said second plurality of capacitive elements, said second plurality of capacitive elements being further coupled to the second output line.

8. The binning circuit of claim 7, wherein said first and second plurality of sample switches and capacitive elements comprise an even number of sample switches and capacitive elements.

9. A method of binning an output of an active image sensor, comprising:
    sampling and respectively storing analog output signal values from a plurality of pixels from a column line of said sensor according to a first predetermined sequence;
    sampling and respectively storing analog reset signal values from said plurality of pixels from said column line of said sensor according to a second predetermined sequence;
    subsequently combining and outputting all sampled and respectively stored analog output signal values on a first output line; and
    combining and outputting all sampled and respectively stored analog reset signal values on a second output line.

10. The method according to claim 9, wherein said step of sampling said analog output signal values comprises storing each analog output signal in a respective capacitive element of a first plurality of capacitive elements according to said first predetermined sequence.

11. The method according to claim 9, wherein said step of sampling said analog reset signal values comprises storing each analog reset signal in a respective capacitive element of a second plurality of capacitive elements according to said second predetermined sequence.

12. The method according to claim 9, wherein said first and second predetermined sequences are determined by a less-than-full pixel resolution condition.

13. The method according to claim 12, wherein said first and second predetermined sequences further comprise interpolating different row output and reset signal values from a column readout circuit in said active image sensor.

14. The method according to claim 13, wherein said predetermined sequence further comprises sampling identical colors from different rows from a column readout circuit in said active image sensor.

15. The method according to claim 12, wherein said first and second predetermined sequences further comprise interpolating different column readout circuits in said active image sensor.

16. The method according to claim 9, wherein said first and second predetermined sequence is determined by a Bayer pattern.

17. The method of claim 9, further comprising:
subtracting said combined analog output signal from said combined analog reset signal.

18. The method of claim 17 further comprising:
calculating a color separation value of said sampled signal values of said sensor.

19. A charge-domain readout circuit comprising:
a plurality of column readout circuits each of which sample and combine multiple pixel signal values and reset signal values of a plurality of pixels of an active pixel sensor, wherein each column readout circuit is associated with a respective column of sensors in said active pixel sensor, each of said plurality of column readout circuits comprising:
a first plurality of charge storage devices for respectively storing each of said multiple pixel signal values from said column of sensors,
a second plurality of charge storage devices for respectively storing each of said multiple reset signal values from said column of sensors, and
a combining circuit for combining said respectively stored multiple pixel signal values and reset signal values;
a first bus for receiving pixel signal values stored by a selected one of said column readout circuits; and
a second bus for receiving said reset signal values stored by a selected one of said column readout circuits.

20. The circuit of claim 19,
wherein each of said combining circuits comprises a plurality of first switches;
wherein each of said pluralities of charge storage devices comprises a plurality of charge storage elements;
wherein each of said plurality of first switches is coupled to a respective one of said plurality of charge storage elements; and
wherein said plurality of first switches can be selectively enabled to sample a signal from a sensor in said array to be stored by said charge storage element.

21. The circuit of claim 20, wherein each column readout circuit comprises a plurality of second switches which can be selectively enabled to hold one side of said charge storage elements at a reference voltage when a corresponding one of said first switches is enabled to sample a value from a sensor.

22. The circuit of claim 20, wherein each column readout circuit comprises a switch that can be selectively enabled to short together one side of each plurality of charge storage elements.

23. The circuit of claim 19, further comprising column switches coupled between each of said column readout circuits, wherein said column switches can be selectively enabled to couple together said stored pixel signal and reset signal values present on said column of sensors in said active pixel sensor.

24. A method of reading out values from active pixel sensors in an array of sensors, comprising:
selecting multiple rows of sensors whose values are to be read out on a column line;
storing correlated double sampled values for a plurality of sensors in said selected rows on the column line, wherein said values for each sensor are stored by a respective pair of charge storage devices in a readout circuit associated with a column in said array in which said sensor is located;
combining said stored signal values and
sensing said stored values associated with said plurality of sensors in said selected rows using an operational amplifier-based charge sensing circuit that is common to said readout circuit.

25. The method of claim 24 wherein said act of storing correlated double sampled values comprises sampling and storing a signal value of a sensor and sampling and storing a reset value of said sensor.

26. The method of claim 25, further comprising setting a reference voltage on first sides of a set of respective ones of a plurality of charge storage devices and subsequently coupling said signal and reset values to second sides of said respective ones of a plurality of charge storage devices.

27. The method of claim 26 wherein setting a reference voltage comprises providing said reference voltage to said common operational amplifier-based charge sensing circuit.

28. The method of claim 27 wherein sensing said stored values comprises using a crowbar switch to force charge stored in said readout circuit onto feedback capacitive elements in said operational amplifier-based charge sensing circuit.

29. A processing system, comprising:
a processing circuit;
an imaging circuit coupled to said processing circuit, said imaging circuit having a charge-domain readout circuit, said readout circuit comprising:
a plurality of column readout circuits each of which sample and combine multiple pixel signal and reset signal values of a plurality of pixels of an active pixel sensor, wherein each column readout circuit is associated with a respective column of sensors in an active pixel sensor, each of said plurality of column readout circuits comprising:
a first plurality of charge storage devices for respectively storing each of said multiple pixel signal values from said column of sensors,
a second plurality of charge storage devices for respectively storing each of said multiple reset signal values from said column of sensors, and
a combining circuit for combining said respectively stored multiple pixel signal values and reset signal values;
a first bus for receiving pixel signal values stored by a selected one of said column readout circuits; and
a second bus for receiving said pixel reset signal values stored by a selected one of said column readout circuits.

30. The processing system of claim 29, wherein
each of said combining circuits comprises a plurality of first switches,
each of said pluralities of charge storage devices comprises a plurality of charge storage elements,
each of said plurality of first switches is coupled to a respective one of said plurality of charge storage elements, and
wherein said plurality of first switches can be selectively enabled to sample a signal from a sensor in said array to be stored by said charge storage element.

31. The processing system of claim 30, wherein each column readout circuit further comprises a plurality of second switches which can be selectively enabled to hold one side of said charge storage elements at a reference voltage when a corresponding one of said first switches is enabled to sample a value from a sensor.

32. The processing system of claim 31, wherein each column readout circuit comprises a switch which selectively can be enabled to short together one side of each plurality of charge storage elements.

33. The processing system of claim 32, further comprising column switches coupled between each of said column readout circuits, wherein said column switches can be selectively enabled to couple together said stored pixel signal values and reset signal values present on said column of sensors in said active pixel sensor.

* * * * *